United States Patent [19]

Iwasaki

[11] Patent Number: 4,642,695

[45] Date of Patent: Feb. 10, 1987

[54] PROJECTION CATHODE-RAY TUBE HAVING ENHANCED IMAGE BRIGHTNESS

[76] Inventor: Yasuo Iwasaki, c/o Mitsubishi Denki Kabushiki Kaisha Kyoto Seisakusho, 1 Babazusho, Nagaokakyo-shi, Kyoto-fu, Japan

[21] Appl. No.: 666,422

[22] Filed: Oct. 30, 1984

[30] Foreign Application Priority Data

Nov. 4, 1983 [JP] Japan ............................... 58-207750

[51] Int. Cl.⁴ ......................... H04N 5/74; H04N 9/31

[52] U.S. Cl. ....................................... 358/237; 358/64

[58] Field of Search ...................... 358/60, 64, 73, 231, 358/237; 340/700, 720; 313/461, 465, 473, 477 R, 482

[56] References Cited

U.S. PATENT DOCUMENTS

| | | | |
|---|---|---|---|
| 2,481,621 | 9/1949 | Rosenthal | 358/231 |
| 2,527,879 | 9/1970 | Pritchard | 358/60 |
| 4,518,985 | 5/1985 | Tamatani | 358/60 |

*Primary Examiner*—Tommy P. Chin

[57] ABSTRACT

A projection cathode-ray tube comprises a vacuum vessel (10) having a face plate (7), an interference thin film (20) on the inner surface of the face plate, a phosphor layer (8) on the interference thin film, a metal-back film (9) on the phosphor layer and an electron gun within the vessel. More than 30% of the total luminous flux from an emission point in the phosphor layer to which the electron beam of the electron gun is applied exists within a divergent angle of ±30° in the direction normal to the face plate.

3 Claims, 8 Drawing Figures

PROJECTION CATHODE-RAY TUBE HAVING ENHANCED IMAGE BRIGHTNESS

BACKGROUND OF THE INVENTION

1. Field of the Invention

The present invention relates to a projection cathode-ray tube in which an image on a phosphor layer is enlarged and projected on a screen located at a given distance ahead through a projection lens in front of said phosphor layer.

2. Description of the Prior Art

In a television set with a color cathode-ray tube of a shadow mask type widely utilized at present, its screen size is considered to be limited to approximately 30" to 40" at maximum principally because of the structural restrictions. As a result, as one means for receiving a video image and the like with a larger screen size, a projection type television set 1 as shown in FIG. 1 has been developed and is widely utilized nowadays.

In such a projection type television set 1, monochromatic images in blue, green and red respectively obtained by small-sized monochromatic cathode-ray tubes 2, 3 and 4 of approximately 5" to 8" size are enlarged and projected on a screen 6 located at a given distance ahead by means of projection lens units 5, so that a color image of a large size can be obtained on the screen 6. Since the size of the screen 6 is generally 40" to 70", the images on the small-sized monochromatic cathode-ray tubes 2, 3 and 4 are projected to be 50 to 100 times larger on the screen 6. Therefore, in such a projection type television set 1, it is an important point in performance how to obtain a sufficiently bright image on the screen 6. For this reason, constant efforts have been made for improvement of phosphor materials for use in projection cathode-ray tubes, application of a structure of a cathode-ray tube enabling highly loaded operation, improvement of the screen 6 and the projection lens unit 5, and the like.

One of the major factors hindering improvement of the brightness of the projected image in the projection type television set 1 is a low efficiency for gathering luminous flux into the projection lens unit 5 from the monochromatic cathode-ray tubes 2, 3 and 4. This problem will be described in more detail with reference to FIG. 2.

FIG. 2 is a sectional structural view showing the monochromatic cathode-ray tube 2, 3 or 4 of the projection type television set 1 and the projection lens unit 5 in front of the tube. The monochromatic cathode-ray tube 2, 3 or 4 comprises a vacuum vessel 10 and an electron gun 13 enclosed in the vessel 10. On the inner surface of the face plate 7 constituting a portion of the vacuum vessel 10, a phosphor layer 8 is formed and on the phosphor layer 8, a metal-back film 9 made of evaporated aluminum serving as a high-voltage electrode and a reflective film is formed. By the energy of an electron beam from the electron gun located behind the metal-back film 9, the phosphor layer 8 is excited so that output of phosphorescent light can be obtained.

The projection lens units 5 are disposed close to the above stated face plates 7 of the monochromatic cathode-ray tubes 2, 3 and 4, respectively. The projection lens unit 5 is structured as a compound lens having 3 to 8 optical lenses generally incorporated in a barrel 12. The projection lens unit 5 shown in the drawing is an example of a compound lens comprising six lenses. In the case of the projection lens unit 5 as described above, it is difficult to select a large lens diameter as compared with the face plate 7 of the monochromatic cathode-ray tube 2, 3 or 4, because of the limited conditions as to the aberration, the cost and the space. As a result, the usable angle with which light emitted from the phosphor layer 8 can be accepted into the projection lens unit 5 is limited to an extremely small range.

For example, as for the light emission at the center of the phosphor layer 8, the range of the optically usable outermost light paths is shown as lc. The angle $\theta_1$ formed by the usable outermost light path with respect to a normal perpendicular to the phosphor layer 8 at the emission point is in the range of $\theta = 15°$ to $20°$ approximately, which differs a little depending on the structure of the projection lens unit 5.

As for the light emission in a peripheral portion of the phosphor layer 8, the range of the optically usable outermost light paths is shown as le. The angles $\theta_2$ and $\theta_3$ formed by the usable outermost light paths le with respect to a normal perpendicular to the phosphor layer 8 are approximately $15° \leqq \theta_2 \leqq 20°$ and $25 \leqq \theta_3 \leqq 30°$, respectively.

Accordingly, both in the central portion and in the peripheral portion of the phosphor layer 8, any luminous flux emitted at a divergent angle larger than 30° with respect to a normal perpendicular to the phosphor layer 8 is useless flux which cannot be transmitted through an usable light path of the projection lens unit 5.

FIG. 3 shows orientation dependence of the luminous flux from the phosphor layer 8 excited by an electron beam EB in a conventional monochromatic cathode-ray tube. In this case, the phosphor layer 8 serves as a nearly perfect diffuser and accordingly, the Lambert law applies. The curve K in FIG. 5 shows the relative luminous intensity with respect to the divergent angle in such case. In the following, we will describe the efficiency for accepting the emitted light into the projection lens unit 5 in case of the phosphor layer 8 serving as a nearly perfect diffuser as described above.

Referring to FIG. 3, assuming that a minor emission area at a point P in the phosphor layer 8 is ΔS, that the brightness of the area in a direction inclined by $\theta$ with respect to the normal is $L_\theta$, and that the luminous intensity in the direction $\theta$ at a sufficiently long distance as compared with ΔS is $I_\theta$, the following equation is obtained.

$$I_\theta = \int L_\theta \cdot \cos\theta ds = L_\theta \cdot \cos\theta . \Delta S \quad \text{(I)}$$

If the emission area is a perfect diffuser, $L_\theta$ *is constant independently of the angle* $\theta$ *and can be represented as follows*:

$$L_\theta = L = constant \quad \text{(II)}$$

Now, assuming that the luminous flux emitted forward from the perfect diffuser ΔS at the point P into a cone with an apex angle of $2\theta$ is $\phi_\theta$, the following equation is established.

$$\phi_\theta = \int I_\theta d_\omega = \int_0^{2\pi} d\phi \int_0^{\theta} I_\theta \sin\theta \, d\theta \quad \text{(III)}$$

By substituting the equations (I) and (II) into the equation (III), the following equation is established.

$$\phi_\theta = 2\pi L\Delta S \int_0^\theta \sin\theta \cdot \cos\theta \, d\theta = \pi L\Delta S \sin^2\theta \quad \text{(IV)}$$

Accordingly, by substituting $$\phi_T = \pi L\Delta S \quad \text{(V)}$$

into the equation (IV), the total luminous flux $\phi_T$ emitted forward from $\Delta_S$ is obtained as follows:

$$\phi_T = \pi L\Delta S \quad \text{(V)}$$

Consequently, if the luminous flux emitted into the cone having the apex angle $2\theta$, out of the total luminous flux emitted from $\Delta S$ at the point P shown in FIG. 3 is accepted into the projection lens unit 5, the efficiency for accepting luminous flux, namely the light gathering efficiency $\eta$ is represented by the following equation, based on the equations (IV) and (V).

$$\eta = \frac{\phi_\theta}{\phi_T} = \sin^2\theta \quad \text{(VI)}$$

FIG. 4 shows a relation between the angle $\theta$, namely, the angle for accepting light from a monochromatic cathode-ray tube into the projection lens unit 5 and the light gathering efficiency. If the accepting angle is $\theta = 30°$ as in the above described conventional projection type television set, the light gathering efficiency is 25%, the remaining luminous flux of 75% never contributing to the brightness of the projected image on the screen.

SUMMARY OF THE INVENTION

The present invention aims to improve the efficiency for accepting luminous flux from a monochromatic projection cathode-ray tube into a projection lens unit in a conventional projection type television set as described above. A projection cathode-ray tube in accordance with the present invention comprises a vacuum vessel having a face plate, a phosphor layer on the inner surface of the face plate and an electron gun within the vacuum vessel, whereby an image on the phosphor layer is enlarged and projected on a screen located at a given distance ahead, through a projection lens in front of the face plate, and the above described projection cathode-ray tube is characterized in that more than 30% of the total luminous flux emitted from an emission point in the phosphor layer is concentrated within a solid angle provided in a forward direction from the emission point at an apex angle of $\pm 30°$ with a normal perpendicular to the phosphor layer being regarded as the center axis.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
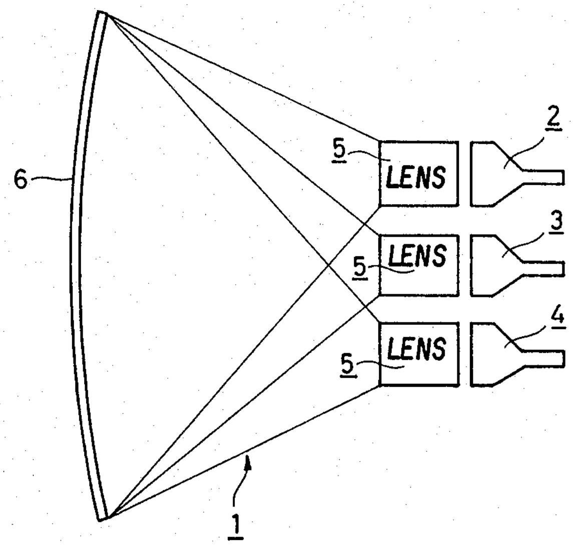
FIG.1 PRIOR ART
FIG. 1 is a schematic illustration showing the composition of a projection type television set.
Figure 2:
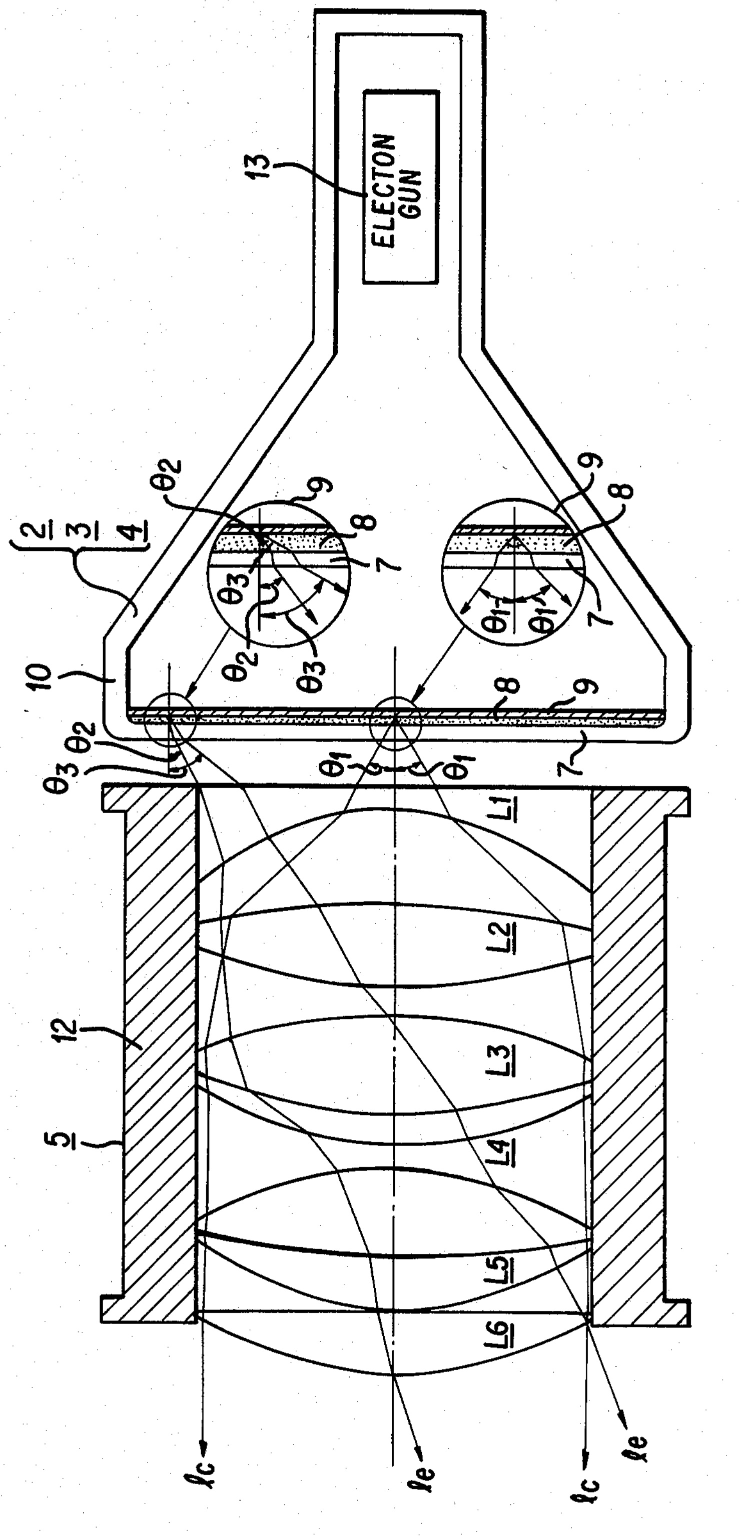
FIG. 2 (PRIOR ART)
FIG. 2 is a sectional structural view showing a projection lens unit and a projection monochromatic cathode-ray tube disposed behind it.
Figure 3:
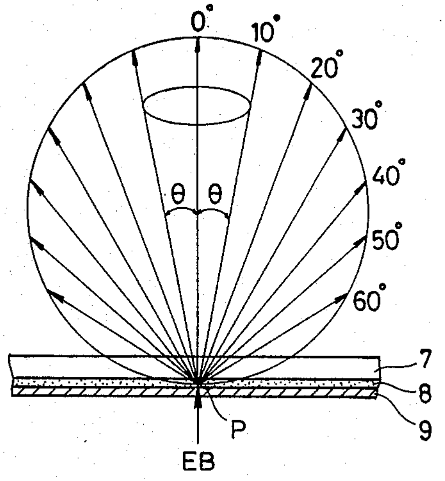
FIG. 3 PRIOR ART
FIG. 3 is a diagram showing luminous intensity distribution from an emission point in a phosphor layer of a conventional projection cathode-ray tube.
Figure 4:
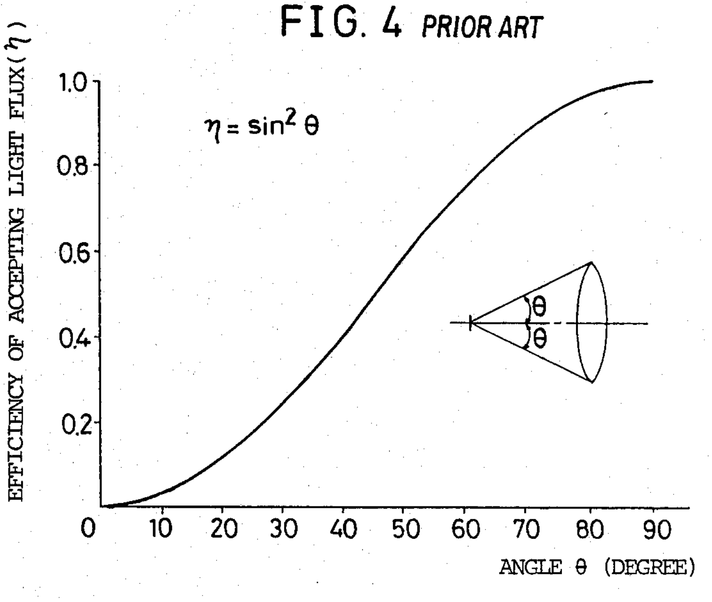
FIG. 4 PRIOR ART
FIG. 4 is a graph showing the relation between the angle for accepting luminous flux into the projection lens unit and the efficiency of light gathering.
Figure 5:
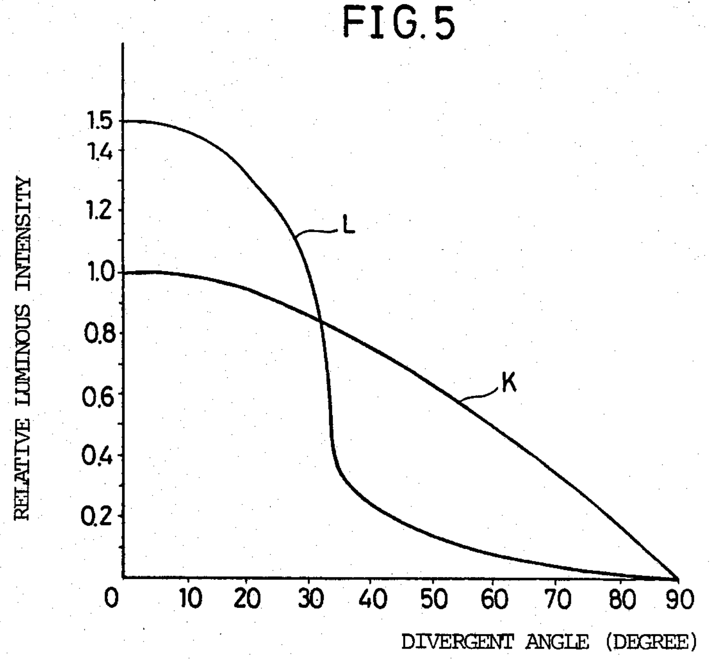
FIG. 5 is a graph showing the relative luminous intensities with respect to the divergent angle of luminous flux from the phosphor layer.
Figure 6:
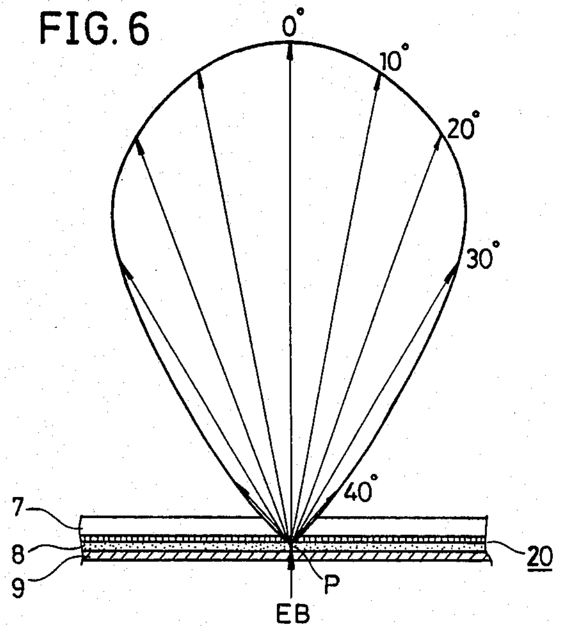
FIG. 6 is a diagram showing luminous intensity distribution from an emission point in a phosphor layer of a projection cathode-ray tube in accordance with the present invention.
Figure 7:
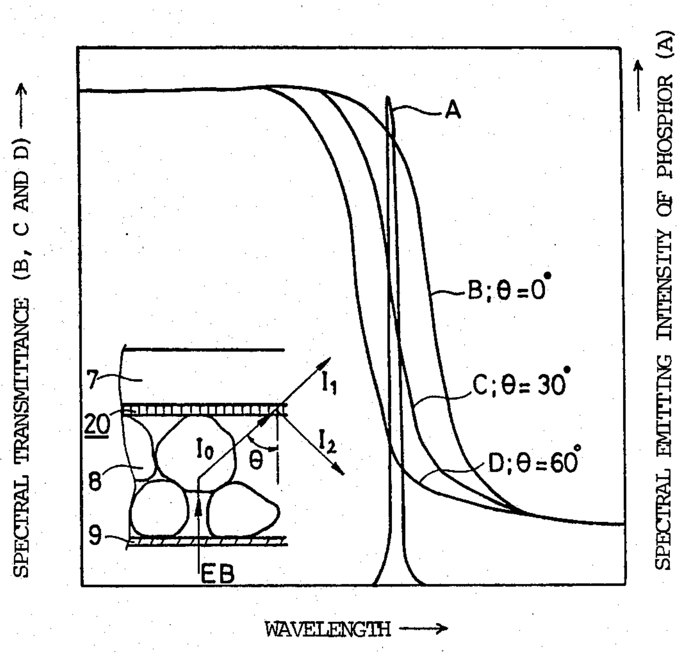
FIG. 7 is a diagram showing dependence of the transmittance of an interference thin film upon the angle of incidence and the wavelength.

In the following, an embodiment of the present invention will be described with reference to FIGS. 5 to 8. An important feature of the present invention resides in that the luminous flux is made concentrated as far as possible within the angle of $\pm 30°$ for accepting the flux since it is difficult due to the limited conditions as described previously to increase the angle $\theta$ for the purpose of improving the light gathering efficiency. FIG. 6 shows an example of orientation dependence of the luminous flux from an emission point in the phosphor layer 8 which is excited by an electron beam EB in a projection monochromatic cathode-ray tube of the present invention. In this case, since a considerable part of the luminous flux in the region having the divergent angle of more than 30° is concentrated into the region having the divergent angle of 30° or less, the apparent light gathering efficiency of the projection lens unit 5 is improved and the luminous intensity in the direction within the divergent angle of 30° is remarkably emphasized as compared with the conventional case shown in FIG. 3 and the brightness of the projected image on the screen 6 through the projection lens unit 5 is thus considerably increased. The curve L in FIG. 5 shows the relative luminous intensity with respect to the divergent angle in such a case as shown in FIG. 6. For the purposed of obtaining such luminous intensity distribution, an optical interference thin film 20 is provided between the face plate 7 and the phosphor layer 8 as shown in FIG. 6. The spectral transmission characteristics of the interference thin film is dependent on the incident angle of the light as shown in FIG. 7. In FIG. 7, the curve A represents emitting intensity of phosphor. The curves B, C and D represent preferred spectral transmission characteristics of the interference thin film, indicating changes of the transmittance according to the wavelength changes at the incident angles $\theta$ of 0°, 30° and 60°, respectively. More specifically, the interference thin film involves notable orientation dependence of the transmittance at the wavelength of the phosphorescence A.

Referring to an illustration inserted in FIG. 7, if such an interference thin film 20 is utilized, the transmittance $I_1/I_0$ as a ratio of the light $I_1$ transmitted through the interference thin film 20 to the incident light $I_0$ emitted from the phosphor particles excited by the electron beam EB becomes largest with the incident light perpendicular to the interference thin film ($\theta = 0°$) and decreases as the incident angle $\theta$ becomes large. In this case, the light not transmitted is returned to the phosphor layer 8 as a reflected light $I_2$. The reflected light $I_2$ is reflected diffusely by means of the phosphor particles and the metal-back film 9 so as to be returned again to the interference thin film 20. Out of the diffusely reflected light, most of the luminous flux having small values of $\theta$ is transmitted through the interference thin film 20 and the remaining light is again reflected. By repetition of such process, the luminous flux is concentrated within a small divergent angle $\theta$.

Figure 8:
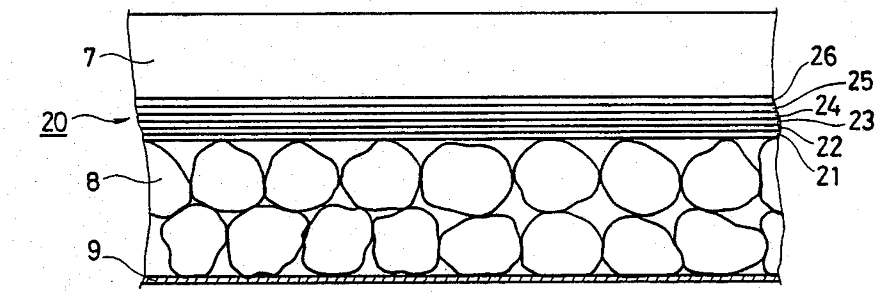
FIG. 8 is a schematic illustration showing the structure of an interference thin film.

FIG. 8 shows an example of the interference thin film 20 having the transmission characteristics dependent on the incident angle. The interference thin film 20 comprises six layers 21 to 26, three alternate layers 21, 23 and 25 being layers of low refractive index and the other layers 22, 24 and 26 being layers of high refractive index. Table I shows the materials and the thickness of the respective layers forming the interference thin film 20.

TABLE I

| Layer | Material | Thickness (Å) |
|---|---|---|
| 21 | $SiO_2$ | 1250 |
| 22 | $Ta_2O_5$ | 300 |
| 23 | $SiO_2$ | 200 |
| 24 | $Ta_2O_5$ | 1600 |
| 25 | $SiO_2$ | 300 |
| 26 | $Ta_2O_5$ | 200 |

The respective layers listed in Table I can be formed by the ordinary vacuum evaporation or sputtering process.

In order to increase the emission efficiency within the small divergent angle $\theta$, it is preferred that the phosphor particles in the phosphor layer 8 be of plate-like crystal formed parallel to the face plate 7.

As described previously, the angle for accepting luminous flux into the projection lens is in the range of ±30° at most. In a conventional projection cathode-ray tube, luminous flux within the acceptance angle of ±30° is approximately 25% of the total luminous flux emitted from an emission point of the phosphor layer. If the luminous flux to be accepted is increased to 30% of the total luminous flux, the brightness can be increased by approximately 20%. The difference of approximately 10% or more in the image brightness on a TV screen and the like can be visually perceived by a human. Accordingly, it can be said that by improving the brightness by 20%, the performance is sufficiently enhanced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection cathode-ray tube comprising a vacuum vessel having a face plate, a phosphor layer on an inner surface of said face plate, an interference thin film between the inner surface of said face plate and an outer surface of said phosphor layer, a metal-back film on an inner surface of said phosphor layer and an electron gun within said vessel, wherein an image on said phosphor layer is enlarged and projected on a screen located at a given distance ahead through a projection lens in front of said face plate, such that more than 30% of all luminous flux emitted from an emission point in said phosphor layer is concentrated within a divergent angle of ±30° in a direction normal to said face plate.

2. A projection cathode-ray tube in accordance with claim 1, characterized in that phosphor particles in said phosphor layer are of plate-like crystal parallel to said face plate.

3. A projection cathode-ray tube in accordance with claim 1, characterized in that phosphor particles in said phosphor layer are of plate-like cyrstal parallel to said face plate.

* * * * *